Feb. 8, 1927. 1,617,008
C. BIENZ
CYLINDER FOR INTERNAL COMBUSTION ENGINES
Filed Jan. 17, 1924

Inventor:
CHARLES BIENZ
by Ellis S. Middleton
Atty.

Patented Feb. 8, 1927.

1,617,008

UNITED STATES PATENT OFFICE.

CHARLES BIENZ, OF ST. JEAN, SWITZERLAND.

CYLINDER FOR INTERNAL-COMBUSTION ENGINES.

Application filed January 17, 1924, Serial No. 686,728, and in the Netherlands July 14, 1923.

This invention relates to improvements in cylinders for internal combustion engines or explosion engines and more particularly to a cylinder having sliding valves displaceable along the outer wall of the cylinder and adapted to close a port formed therein.

An object of the present invention is to provide means whereby at the moment of explosion the seating of the valve on the wall of the cylinder is extremely gas tight.

A further object of the invention is to provide a construction of cylinder wherein the pressure of the gas within the cylinder is utilized to cause the tight seating of the slide valve on the outer wall. A still further object is to improve the lubrication between the slide valve and the outer wall whereby free sliding of the one relatively to the other is effected.

The accompanying drawings illustrate as an example one form of construction according to the present invention.

Figure 1:
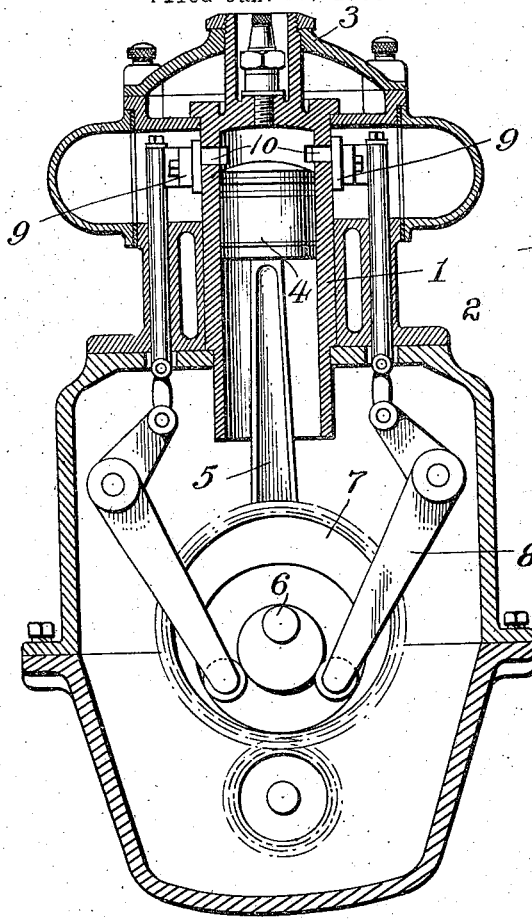
Fig. 1 is a longitudinal section of an engine provided with a cylinder in conformity with the present invention.
Figure 2:
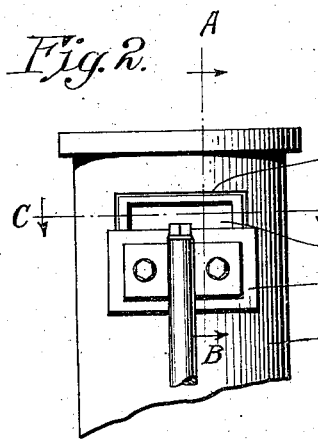
Fig. 2 is a side elevation of the cylinder showing the slide valve.
Figure 3:
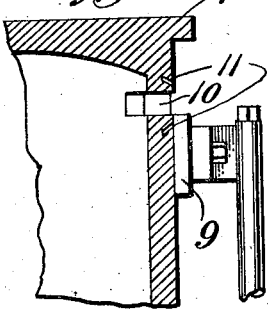
Fig. 3 is a sectional elevation along the line A—B of Fig. 2.
Figure 4:
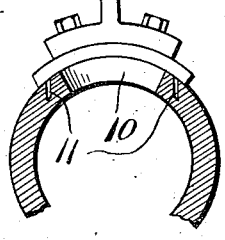
Fig. 4 is a sectional plan along the line C—D of Fig. 2.

Fig. 5 a plan view of the cylinder.

The cylinder 1 of the internal combustion engine illustrated is arranged in a body 2 where it is held by the raised cover 3. In said cylinder 1 reciprocates a piston 4, said piston being connected by a rod 5 with the motor shaft 6. The latter carries a cam plate 7 controlling the levers 8 adapted to cause the displacement of the slide valve 9 against the outer wall of the cylinder 1, the said slide valves closing the ports 10 provided in the walls of the cylinder and controlling the admission of the carburetted gas or the exhaust of the burnt gas.

Said cylinder 1 is grooved by a recess 11 arranged in proximity to the ports 10 so as to reduce the thickness of the walls at this point in order to give them elasticity and allow this part to be pressed by the pressure of the gas in the cylinder against the slide valve 9 in order to secure the resiliency of the closing of the port 10 by the slide valve 9.

With the object of ensuring the lubrication of the slide valve 9 against the consequent friction on the outer wall of the cylinder 1 the latter has formed externally thereon grooves 12 communicating by suitable apertures with the interior of the cylinder 1 so as to allow a portion of the oil contained inside the cylinder to be forced to the outside wall and thus to ensure the lubrication of the slide valve 9 against the sliding friction with the object of insuring the lubrication.

I declare that what I claim is:

In an internal combustion engine, the combination of a cylinder, a piston reciprocable therein, diametrically opposed ports in said cylinder wall, and above the top of said piston, a slide valve having an arcuate surface engaging the outside of said cylinder, and means to reciprocate said valves to cover and uncover said ports, said cylinder having weakening slots cut therein adjacent said ports whereby pressure within the cylinder above the piston will allow slight movement of the cylinder wall against the slide valves.

In witness whereof, I have hereunto signed my name this 3rd day of November, 1923.

CHARLES BIENZ.